(12) United States Patent
Aoki

(10) Patent No.: US 8,859,115 B2
(45) Date of Patent: Oct. 14, 2014

(54) CEMENTED CARBIDE MATERIAL FOR SURFACE COATED GEAR CUTTING TOOL AND SURFACE COATED GEAR CUTTING TOOL

(75) Inventor: Yukio Aoki, Kobe (JP)

(73) Assignee: Mitsubishi Materials Corporation, Tokyo (JP)

( * ) Notice: Subject to any disclaimer, the term of this patent is extended or adjusted under 35 U.S.C. 154(b) by 907 days.

(21) Appl. No.: 10/560,171

(22) PCT Filed: Jun. 11, 2004

(86) PCT No.: PCT/JP2004/008557
§ 371 (c)(1),
(2), (4) Date: Dec. 9, 2005

(87) PCT Pub. No.: WO2004/110689
PCT Pub. Date: Dec. 23, 2004

(65) Prior Publication Data
US 2006/0134466 A1  Jun. 22, 2006

(30) Foreign Application Priority Data
Jun. 13, 2003 (JP) ................... 2003-169962

(51) Int. Cl.
*B32B 9/00* (2006.01)
*B32B 19/00* (2006.01)
*B22F 3/00* (2006.01)
*C22C 1/05* (2006.01)
*C22C 29/04* (2006.01)
*C22C 29/08* (2006.01)
*C23C 30/00* (2006.01)
*B23F 21/16* (2006.01)

(52) U.S. Cl.
CPC ............ *B23F 21/16* (2013.01); *C22C 29/08* (2013.01); *C23C 30/005* (2013.01)

USPC ............ 428/698; 51/307; 428/552; 428/457; 428/699; 419/15; 419/16

(58) Field of Classification Search
USPC ............... 428/457, 552, 698, 699; 51/307; 419/15, 16
See application file for complete search history.

(56) References Cited

U.S. PATENT DOCUMENTS 4,610,931 A * 9/1986 Nemeth et al. ............... 428/547
5,725,932 A * 3/1998 Iio et al. ....................... 428/172
(Continued)

FOREIGN PATENT DOCUMENTS

JP  59-52951 B2  2/1983
JP  10-237650 A  9/1998
(Continued)

OTHER PUBLICATIONS

Japanese Office Action dated Jul. 21, 2006 for corresponding Japanese Application No. 2003-169962 and its English translation.
(Continued)

*Primary Examiner* — Shuangyi Abu Ali
(74) *Attorney, Agent, or Firm* — Leason Ellis LLP.

(57) ABSTRACT

This cemented carbide material for a surface coated gear cutting tool is employed in a substrate for a surface coated gear cutting tool which is obtained by forming a hard coated layer on a surface of the substrate, the cemented carbide material for a surface coated gear cutting tool includes a WC-βt-Co based cemented carbide, wherein a content of Co forming a binder phase of the cemented carbide material is in a range of 12 to 17 wt %, and among components of a βt solid solution forming a hard phase of the cemented carbide material, a content of components excluding WC is in a range of 15 to 20 wt %, and a total content of Ta carbonitride and Nb caronitride is in a range of 5 to 8 wt %.

2 Claims, 1 Drawing Sheet

(56) References Cited

U.S. PATENT DOCUMENTS

| | | | |
|---|---|---|---|
| 6,057,046 A | * | 5/2000 | Tsuda et al. .................. 428/551 |
| 7,163,657 B2 | * | 1/2007 | Heinrich et al. ................ 419/13 |

FOREIGN PATENT DOCUMENTS

| | | | |
|---|---|---|---|
| JP | 2001-20029 A | | 1/2001 |
| JP | 2002-283142 | | 10/2002 |
| JP | 2003-266242 | * | 9/2003 .............. B23F 21/16 |
| JP | 2003-266243 A | | 9/2003 |
| WO | 98/03691 | | 1/1998 |

OTHER PUBLICATIONS

Suzuki, Cemented Carbide and Sintered Hard Material, Feb. 20, 1986, pp. 302-303, Maruzen Company Limited, Japan (English translation (Abstract) attached).

* cited by examiner and claims the benefit of Japanese
CEMENTED CARBIDE MATERIAL FOR SURFACE COATED GEAR CUTTING TOOL AND SURFACE COATED GEAR CUTTING TOOL

CROSS-REFERENCE TO PRIOR APPLICATION

This is a U.S. National Phase Application under 35 U.S.C. §371 of International Patent Application No. PCT/JP2004/008557 filed Jun. 11, 2004, and claims the benefit of Japanese Patent Application No. 2003-169962 filed Jun. 13, 2003, both of which are incorporated by reference herein. The International Application was published in Japanese on Dec. 23, 2004 as WO 2004/110689 A1 under PCT Article 21(2).

TECHNICAL FIELD

The present invention relates to a cemented carbide material for a surface coated gear cutting tool suitable for a surface coated gear cutting tool in which a hard coated layer is formed on a surface of a substrate.

BACKGROUND ART

High-speed steel, cemented carbide and the like have been conventionally employed as compositional materials of substrates for hobs (cutting tools) which are used in a gear cutting. Currently, a coating hob is employed in which a hard coated layer is formed on a surface of a substrate consisting of these materials. Compared with hobs in which a high-speed steel substrate is employed, hobs in which a cemented carbide substrate is employed do not require a cutting oil for cooling during cutting, therefore, offering benefits as being superior with respect to the environment and production efficiency. For this reason, various techniques relating to the cemented carbide materials which are applicable in hob substrates have been made, such as those disclosed in Japanese Examined Patent Application, Second Publication No. S59-52951 and Japanese Unexamined Patent Application, First Publication No. 2001-20029.

According to the techniques disclosed in the above patent documents, it is possible to improve resistance to chipping and resistance to thermal cracking by controlling a content of a βt solid solution in a WC-βt-Co based cemented carbide.

However, in a gear cutting using the hob, there has been a growing demand to increase a hobbing speed, for a purpose of improving production efficiency. It is found that when using hobs in which the cemented carbide disclosed in the aforementioned patent documents are employed under high-speed cutting conditions of 350 m/min or more, chipping readily occurs due to microscopic vibrational movements accompanying high-speed rotation; as a result, a useable lifecycle of these hobs is reached within a comparatively short period of time.

DISCLOSURE OF THE INVENTION

The present invention aims to provide a cemented carbide material for a surface coated gear cutting tool which exhibits excellent properties in resistance to chipping, resistance to thermal cracking and resistance to chip adhesion, even under high-speed cutting conditions.

As disclosed in Japanese Examined Patent Application, Second Publication No. 59-52951 and Japanese Unexamined Patent Application, First Publication No. 2001-20029, the cemented carbides in these documents were prepared in view of use under a cutting speed in a range of 200 to 300 m/min. Use in high-speed cutting applications for a cutting speed of 350 m/min or more was not assumed. Accordingly, the present inventors conducted extensive research into compositions of a hard phase and a binder phase in WC-βt-Co based cemented carbide in order to obtain a cemented carbide material which can endure the high-speed cutting; thereby, the present invention can be completed.

A cemented carbide material for a surface coated gear cutting tool of the present invention is employed in a substrate for a surface coated gear cutting tool obtained by forming a hard coated layer on a surface of the substrate, the cemented carbide material for a surface coated gear cutting tool includes a WC-βt-Co based cemented carbide, wherein a content of Co forming a binder phase of the cemented carbide material for a surface coated gear cutting tool is in a range of 12 to 17 wt %, and among components of a βt solid solution forming a hard phase of the cemented carbide material for a surface coated gear cutting tool, a content of components excluding WC is in a range of 15 to 20 wt %, and a total content of Ta carbonitride and Nb caronitride is in a range of 5 to 8 wt %.

According to the above features, the present invention provides a cemented carbide material by which it is possible to realize a surface coated gear cutting tool having excellent resistance to chipping and excellent resistance to thermal cracking even under high-speed cutting conditions of 350 m/min or more.

A Nb content $D_{Nb}$ and a Ta content $D_{Ta}$ in the βt solid solution may satisfy a relational expression of $D_{Nb}/(D_{Nb}+D_{Ta}) \geq 0.7$. In this case, it is possible to improve wear resistance of the cemented carbide material. More specifically, a cemented carbide material can be provided for realizing a gear cutting tool having superior wear resistance at high hobbing temperatures.

Fracture toughness at room temperature of the above cemented carbide material for a surface coated gear cutting tool may be in a range of 9.5 to 13 $MPa(m)^{1/2}$. In this case, a cemented carbide material can be provided for realizing a gear cutting tool having superior wear resistance and superior resistance to chipping under high-speed hobbing conditions.

A surface coated gear cutting tool of the present invention includes the above described cemented carbide material for surface coated gear cutting tools.

According to the above feature, by providing a substrate including the cemented carbide material of the present invention, it is possible to realize superior resistance to chipping and superior resistance to thermal cracking, even under high-speed hobbing conditions of 350 m/min or more; thereby, gear cutting over a long period of time with high production efficiency can be conducted. Furthermore, due to the excellent resistance to chip adhesion of the cemented carbide material of the present invention, chips from workpiece material being machined do not readily adhere, even after a hard coated layer on a rake face in a cutting tooth has been removed through regrinding. Thus, good hobbing performance over a long period of time can be obtained.

BEST MODE FOR CARRYING OUT THE INVENTION

Preferred embodiments of the present invention will now be explained with reference to the figures. The present invention is not limited to the following embodiments and constituent elements of these embodiments may be appropriately combined.

Embodiments of the present invention will now be explained with reference to the figures.

Figure 1:
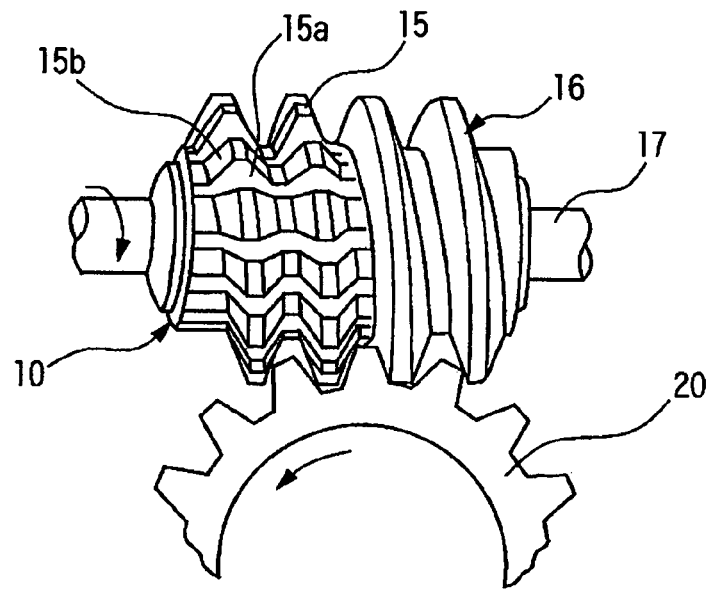
FIG. 1 is a schematic structural diagram of a coating hob.

FIG. 1 is a schematic structural diagram of a coating hob (surface coated gear cutting tool) which can be formed using a cemented carbide material according to the present invention. In this figure, depiction of cutting teeth 15 have been omitted in a right portion of a hob 10. The coating hob 10 shown in FIG. 1 is a milling cutter in which cutting teeth 15 are provided in a worm, and machining of a gear is carried out by revolving the coating hob 10 around an axis 17. Along with rotation of this coating hob 10, each cutting tooth 15 on the screw surface 16 appears one by one to the surface where tooth profile is generated on a cylindrical workpiece 20. Then, a rack, which goes straight on this surface, is projected.

The cylindrical workpiece 20 is revolved so as to engage with this rack, and simultaneously the surface in which the tooth profile is to be formed is relayed in a tooth trace direction of the gear; thereby, the tooth profile can be formed in the cylindrical workpiece 20.

In the aforementioned coating hob 10, a substrate is formed using the cemented carbide material of the present invention. In other words, the substrate which is included in the coating hob 10 in this embodiment, includes the cemented carbide material in which a content of Co forming a binder phase of WC-β-t-Co based cemented carbide is in a range of 12 to 17 wt %, and among components of the βt solid solution forming a hard phase, a content of components excluding WC is in a range of 15 to 20 wt %, and a total content of Ta carbonitride and Nb caronitride is in a range of 5 to 8 wt %.

A hard coated layer including, for example, (Al, Ti)N, (Al, Ti) (C, N), (Al, Ti, Si)N, Ti(C, N), (Al, Ti, Si) (B, N) or the like, is formed on a surface of the aforementioned substrate in a chemical vapor deposition method or a physical vapor deposition method, providing effects of improving wear resistance and oxidation resistance of the coating hob 10.

Each of the components included in the cemented carbide material for a surface coated gear cutting tool according to the present invention will now be explained.

Co: Co forms the binder phase in the cemented carbide material. In the case in which the Co content is less than 12 wt %, resistance to chipping of a hob in which the cemented carbide material is employed falls, which is not preferable. In the case in which the Co content is more than 17 wt %, hardness and wear resistance of the material falls, which is not preferable.

βt solid solution: The βt solid solution which forms the solid phase in the material together with the WC phase, indicates a solid solution phase of a B1 structure which mainly includes WC—TiC—(Ta,Nb)C. In some cases, TiN, TaN and the like are included in the βt solid solution. In the present invention, among components forming this βt solid solution, a content of components excluding WC is in a range of 15 to 20 wt %. In the case in which the content of these components is less than 15%, chips from a workpiece material readily adhere on the cutting teeth when hobbing by use of the prepared coating hob. As a result, tool life is reduced. Moreover, oxidation resistance also falls, which is not preferable. On the other hand, in the case in which the content of those components is more than 20 wt %, it is not possible to obtain adequate strength to withstand high-speed cutting conditions, and sufficient resistance to chipping cannot be achieved.

The aforementioned adhesion properties are particularly important when the cutting teeth 15 shown in FIG. 1 is subjected to regrinding. In a coating hob having a hard coated layer formed on a surface thereof, wear occurs around tips of rake faces 15a and edges of flanks 15b on the rake face 15a sides as time passes during a gear cutting work. Therefore, regrinding by which portions of the cutting teeth 15 are removed from the rake face 15a sides, is commonly conducted. In the cutting teeth 15 which have been subjected to this regrinding, the hard coated layer is eliminated on the rake faces 15a. Therefore, in the case in which the cemented carbide material has poor resistance to adhesion, the rake faces 15a are damaged due to repeated adhesion and falling away of chips, thereby causing a marked deterioration in cutting properties. In the cemented carbide material according to the present invention, the components and the contents thereof in the βt solid solution as described above are defined in consideration of the cutting properties after the regrinding. As a result, excellent hobbing performance over a long period of time can be obtained.

(Ta, Nb)C: TaC and NbC are components forming the aforementioned βt solid solution. A total content of these components in the present invention is set to be in a range of 5 to 8 wt %. In the case in which the content of the aforementioned components is less than 5 wt %, sufficient resistance to adhesion and oxidation resistance cannot be obtained. In the case in which the content of these components is more than 8 wt %, an amount of the TiC component in the βt solid solution becomes relatively small. As a result, sufficient wear resistance cannot be obtained. It is even more preferable to set the total content of TaC and NbC to be in a range of 5 to 7 wt %. By providing this component composition, it is possible to further improve wear resistance under high-speed hobbing conditions.

In the cemented carbide material according to the present invention, it is preferable that a Nb content, $D_{Nb}$, and a Ta content, $D_{Ta}$, in the aforementioned βt solid solution satisfy the relational expression of $D_{Nb}/(D_{Nb}+D_{Ta}) \geq 0.7$. If the Nb content and the Ta content are set to satisfy the above expression, wear resistance can be even further improved, and lifecycle of the coating hob 10 can be made even longer.

Here, the present inventors verified that the ranges of the contents of the above components are suitable, and that a cemented carbide material of which composition satisfies the above ranges can have excellent resistance to chipping and excellent resistance to thermal cracking, even under high-speed hobbing conditions of 350 m/min or more. The details of this verification are disclosed in the following examples.

EXAMPLES

Figure 2:
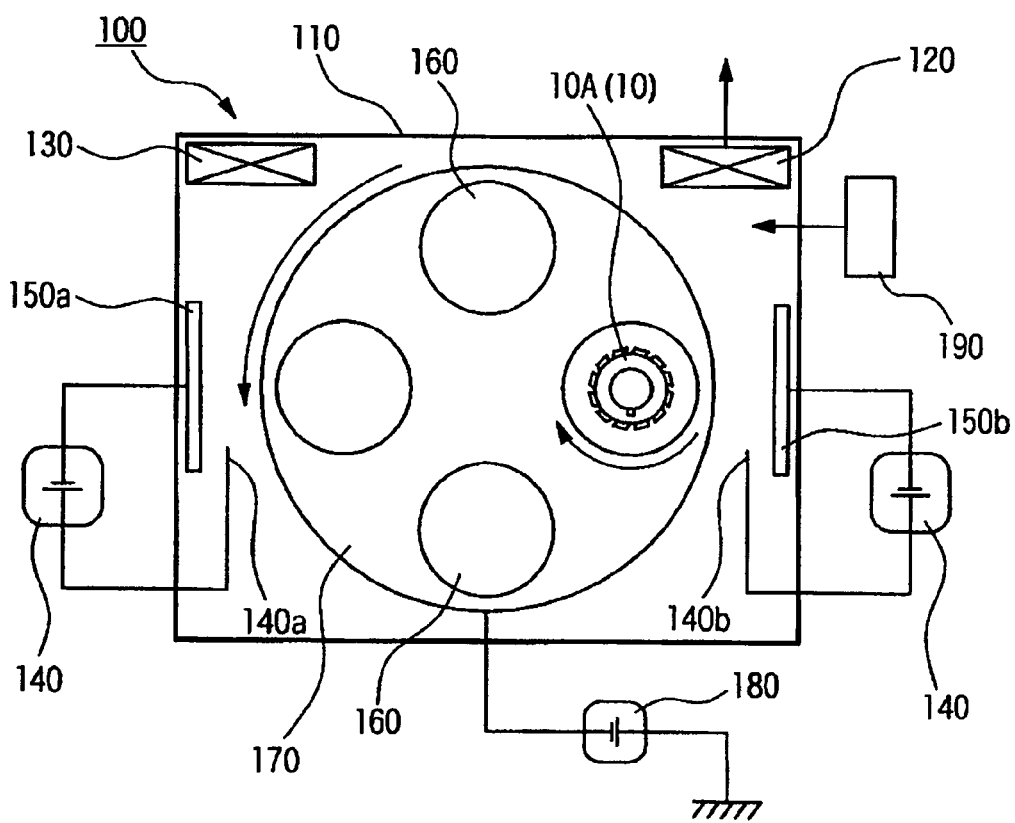
FIG. 2 is a schematic structural diagram of an arc ion plating device for forming a hard coated layer.

The cemented carbide material for a coating hob of the present invention will now be explained more concretely using examples below. FIG. 2 is a schematic structural view of an arc ion plating device employed in a formation of a hard coated layer on a surface of a cemented carbide substrate.

This arc ion plating device 100 includes, as a main portion, a film forming chamber 110, a rotary table 170 for revolving inside the film forming chamber 110, and a plurality of substrate holding members 160 which are disposed along an outer circumference of the rotary table 170 and hold cemented carbide substrates 10A on the rotary table 170 such that they can rotate. An exhaust means 120, a heating means 130 and a gas supply means 190 are connected to the film forming chamber 110.

Cathode electrodes (vapor deposition source) 150a, 150b are disposed near two walls facing each other inside the film forming chamber 110. Power sources 140, 140 are connected to the cathode electrodes 150a, 150b, respectively Anode electrodes 140a, 140b are disposed in a vicinity of the cathode electrodes 150a, 150b respectively such that the anode electrode faces the cathode electrode. A bias power source 180 is connected to the rotary table 170, and is designed to apply a bias voltage to the cemented carbide substrates 10A via each of the substrate holding members 160.

In the examples, various cemented carbide materials were prepared by changing blending compositions of starting material powders. And then, hard coated layers were formed on surfaces of cemented carbide substrates consisting thereof, using the arc ion plating device 100 shown in FIG. 2 so as to form coating hobs. An evaluation of hobbing performance of the various coating hobs was carried out.

(Preparation of Cemented Carbide Material and Hob)

For the starting material powders, medium coarse grained WC powder having an average particle diameter of 2 to 4 μm, and (Ti, W)C powder, TaC powder, NbC powder, TiN powder and Co powder, each of which has an average particle diameter of 1 to 3 μm were prepared. Using these starting material powders, blending was performed to obtain compositions essentially equivalent to blending compositions shown in Tables 1 and 2. Wax was then added, and blended powders were mixed for 24 hours in acetone using ball mills. Here, a solid solution powder having a composition of TiC:WC=30:70 by mass ratio was employed as the (Ti, W)C powder.

Thereafter, the obtained mixed powders were subjected to vacuum drying, and then were pressed so as to form green compacts at a pressure of 100 MPa. These green compacts were sintered in a nitrogen atmosphere of 2 kPa under conditions in which a temperature is 1400° C. and a holding time is 1 hour, so as to obtain round bars of cemented carbide having a diameter of 85 mm and a length of 125 mm. These round bars were subjected to a machine work so as to form solid hob-type cemented carbide substrates having an outer diameter of 80 mm, a length of 120 mm, 4 right-handed screw threads and 22 gashes.

Here, each of items (WC), (Co), (TiC), (TiN), (TaC) and (NbC) in headings in Tables 1 and 2 indicates a content (wt %) of each component when blending the starting material powders.

Item (βt) indicates a content (wt %) of components excluding WC among components forming a βt solid solution which is included in the cemented carbide substrate obtained by sintering.

Item (Nb—Ta ratio) is a parameter expressed by a relational expression of $D_{Nb}/(D_{Nb}+D_{Ta})$ (where $D_{Nb}$ and $D_{Ta}$ express a content of Nb and a content of Ta in the substrate, respectively).

TABLE 1

| Example No. | WC | Co | TiC | TiN | TaC | NbC | βt | Nb—Ta ratio |
|---|---|---|---|---|---|---|---|---|
| 1 | remainder | 12 | 10.5 | 0.5 | 1.0 | 4.0 | 16.0 | 0.79 |
| 2 | remainder | 12 | 11.0 | 1.0 | 0.0 | 6.5 | 18.5 | 1.00 |
| 3 | remainder | 14 | 10.0 | 0.2 | 2.0 | 4.0 | 16.2 | 0.65 |
| 4 | remainder | 14 | 11.0 | 1.0 | 0.0 | 7.0 | 19.0 | 1.00 |
| 5 | remainder | 15 | 11.0 | 1.0 | 0.0 | 7.0 | 19.0 | 1.00 |
| 6 | remainder | 15 | 14.0 | 0.2 | 1.5 | 4.0 | 19.7 | 0.71 |
| 7 | remainder | 16 | 14.0 | 0.5 | 3.5 | 2.0 | 20.0 | 0.35 |
| 8 | remainder | 17 | 11.0 | 1.0 | 0.0 | 7.0 | 19.0 | 1.00 |
| 9 | remainder | 18 | 10.0 | 0.5 | 1.0 | 5.0 | 16.5 | 0.82 |
| 10 | remainder | 18 | 12.0 | 1.0 | 4.0 | 3.0 | 20.0 | 0.41 |
| 11 | remainder | 20 | 9.0 | 0.6 | 1.0 | 5.0 | 15.6 | 0.82 |
| 12 | remainder | 20 | 10.0 | 0.6 | 6.0 | 0.0 | 16.6 | 0.00 |

(wt %)

TABLE 2

| Comparative Example No. | WC | Co | TiC | TiN | TaC | NbC | βt | Nb—Ta ratio |
|---|---|---|---|---|---|---|---|---|
| 1 | remainder | 12 | 18 | 0.9 | 2.0 | 4.0 | 24.9 | 0.65 |
| 2 | remainder | 12 | 25 | 0.4 | 1.0 | 4.0 | 30.4 | 0.79 |
| 3 | remainder | 14 | 5 | 0.9 | 0.0 | 7.0 | 12.9 | 1.00 |
| 4 | remainder | 14 | 13 | 0.2 | 2.0 | 1.0 | 16.2 | 0.32 |
| 5 | remainder | 15 | 7 | 0.2 | 1.5 | 4.0 | 12.7 | 0.71 |
| 6 | remainder | 15 | 9 | 0.9 | 4.0 | 5.0 | 18.9 | 0.54 |
| 7 | remainder | 16 | 14 | 0.5 | 2.0 | 1.0 | 17.5 | 0.32 |
| 8 | remainder | 17 | 8 | 0.9 | 0.0 | 10.0 | 18.9 | 1.00 |
| 9 | remainder | 18 | 13 | 0.5 | 1.0 | 1.0 | 15.5 | 0.48 |
| 10 | remainder | 18 | 20 | 1.5 | 4.0 | 3.0 | 28.5 | 0.41 |
| 11 | remainder | 20 | 8 | 0.6 | 6.0 | 4.0 | 18.6 | 0.38 |
| 12 | remainder | 20 | 9 | 0.6 | 1.0 | 5.0 | 13.0 | 0.82 |

(wt %)

Next, these cemented carbide substrates were subjected to ultrasonic washing in acetone, and dried. Then, the substrates were each attached to the substrate holding members 160 provided along the outer circumference of the rotary table 170 inside the arc ion plating device 100 shown in FIG. 2. Inside of the device 100 was evacuated and then heated to 500° C. using the heater while maintaining a vacuum of 0.5 Pa. Then, an arc discharge was generated between metal Ti of the cathode electrode 150a and the anode electrode 140a under condition that a direct current bias voltage of −1000 V is applied, using the bias power source 180, to the cemented carbide substrates 10A which revolve while rotating on their axes on the rotary table 170. In this way, surfaces of the cemented carbide substrates 10A were subjected to cleaning with Ti bombardment.

Next, while nitrogen gas was introduced as a reaction gas into the device so as to obtain a reaction atmosphere of 10 Pa, a bias voltage of −300 V was applied to the cemented carbide substrates 10A which revolve while rotating on their axes on the rotary table 170. Thereby, an arc discharge was generated between the cathode electrode 150b consisting of TiAl metal and the anode electrode 140b. As a result, a hard coated layer consisting of a (Ti, Al)N layer having a target total layer thickness was deposited along a direction of layer thickness on a surface of each of the aforementioned cemented carbide substrates 10A. In this manner, coating hobs having a shape shown in FIG. 1 were formed.

(Evaluation)

Next, using each of the various hobs formed as described above, gear cutting was conducted for gears which consisted of a low alloy steel of JIS SCr420H and had dimensions and a shape as follows: a module of 1.75; a pressure angle of 17.5°; number of teeth of 33; a helix angle of 36° left-hand; a tooth height of 5.86 mm; and a tooth width of 15.5 mm, under hobbing conditions: a climb cutting; no shift hobbing; dry process (air blow); and high-speed hobbing conditions of various hobbing speeds and feeds shown in Tables 3 and 4. The number of gears which were worked until a width of flank wear reached 0.10 mm (useful lifecycle) was measured. Results of these measurements are shown in Tables 3 and 4.

TABLE 3

| Example No. | Cutting speed (m/min) | Feed (mm/rev) | Number of worked gears | Fracture toughness (MPa√m) |
|---|---|---|---|---|
| 1 | 350 | 2.00 | 1300 | 9.3 |
| 2 | 350 | 2.00 | 1200 | 9.6 |

TABLE 3-continued

| Example No. | Cutting speed (m/min) | Feed (mm/rev) | Number of worked gears | Fracture toughness (MPa√m) |
|---|---|---|---|---|
| 3 | 375 | 2.00 | 950 | 9.7 |
| 4 | 375 | 2.00 | 1500 | 9.9 |
| 5 | 400 | 1.75 | 1200 | 11.0 |
| 6 | 400 | 1.75 | 1200 | 10.5 |
| 7 | 350 | 2.00 | 1000 | 11.2 |
| 8 | 420 | 1.50 | 1300 | 12.5 |
| 9 | 400 | 1.75 | 1300 | 11.6 |
| 10 | 350 | 2.00 | 1100 | 11.8 |
| 11 | 350 | 2.00 | 1200 | 13.0 |
| 12 | 400 | 1.75 | 1100 | 12.8 |

TABLE 4

| Comparative Example No. | Cutting speed (m/min) | Feed (mm/rev) | Number of worked gears | Fracture toughness (MPa√m) | Comments |
|---|---|---|---|---|---|
| 1 | 350 | 2.00 | 50 | 9.1 | chipping |
| 2 | 350 | 2.00 | 100 | 8.6 | chipping |
| 3 | 375 | 2.00 | 150 | 10.3 | chip adhesion |
| 4 | 375 | 2.00 | 500 | 9.4 | chip adhesion |
| 5 | 400 | 1.75 | 200 | 12.0 | chip adhesion |
| 6 | 400 | 1.75 | 700 | 11.3 | greatly abraded |
| 7 | 350 | 2.00 | 450 | 11.5 | chip adhesion |
| 8 | 420 | 1.50 | 600 | 12.7 | greatly abraded |
| 9 | 400 | 1.75 | 400 | 11.8 | chip adhesion |
| 10 | 350 | 2.00 | 30 | 11.0 | chipping |
| 11 | 400 | 1.75 | 650 | 13.0 | greatly abraded |
| 12 | 350 | 2.00 | 250 | 13.5 | chip adhesion |

As shown in Tables 3 and 4, it can be understood that when using the coating hobs of Examples 1 to 12 in which the content of each of the components were controlled to be in the range satisfying features of the present invention, 950 or more of gears could be worked under high-speed hobbing conditions of 350 m/min or more, and excellent resistance to chipping and excellent wear resistance could be achieved even under high-speed hobbing conditions. Further, when using the coating hobs of Examples 1, 2, 4 to 6, 8, 9 and 11 in which the (Nb—Ta ratio) is 0.7 or more, 1200 to 1500 of gears could be worked. Thus, it can be understood that the resistance to chipping and the wear resistance can be improved by controlling the parameter of (Nb—Ta ratio) suitably. It is believed that the reason why the lifecycle can be extended in this way is as follows. Relatively large amount of Nb component is included, resulting in the wear resistance at high temperatures being improved.

In contrast, when using the coating hobs of Comparative Examples 1 to 12 which did not satisfy features of the present invention, the number of worked gears was 30 to 700, and it is clear that adequate performances could not be obtained in resistance to chipping, wear resistance and resistance to chip adhesion under high-speed hobbing conditions of 350 m/min or more.

More specifically, when using coating hobs (Comparative Examples 1 to 3, 5, 10, 12) in which the total amount of TaC and NbC which form the Ta and Nb carbonitrides in the substrate was in a suitable range; however, the content (βt) of the components excluding WC among components of the βt solid solution was not appropriately controlled, chipping or chip adhesion occurred within a short period of time from the start of gear cutting work, and the work could not continue. In particular, when using coating hobs (Comparative Examples 1, 2 and 10) in which the content (βt) of the components excluding WC among components of the βt solid solution was more than 20 wt %, the useable lifecycle was drastically shortened.

To the contrary, when using coating hobs (Comparative Examples 4, 6 to 9 and 11) in which the content (βt) of the components excluding WC among components of the βt solid solution was in an appropriate range; however, the total amount of TaC and NbC was not appropriately controlled, sufficient resistance to adhesion and sufficient wear resistance could not be obtained, resulting in the number of worked gears being 700 or less.

As discussed above, in order to realize a coating hob having a long lifecycle under high-speed hobbing conditions of 350 m/min or more, it is necessary to provide a cemented carbide material in which the content of the components excluding WC among components of the βt solid solution and the total amount of the TaC and NbC are both appropriately controlled.

According to the cemented carbide material for a surface coated gear cutting tool of the present invention, the content of Co of the binder phase in a WC-βt-Co based cemented carbide is in the range of 12 to 17 wt %, and among components of the βt solid solution in the hard phase, the content of components excluding WC is in the range of 15 to 20 wt %, and the total content of Ta carbonitride and Nb caronitride is in the range of 5 to 8 wt %. As a result, when using gear cutting tools in which the aforementioned material is included, excellent resistance to chipping and excellent wear resistance can be achieved, even under high-speed hobbing conditions of 350 m/min or more.

Specifically, by providing a composition in which the Nb content $D_{Nb}$ and the Ta content $D_{Ta}$ in the aforementioned βt solid solution satisfy the relational expression of $D_{Nb}/(D_{Nb}+D_{Ta}) \geq 0.7$, it is possible to even further improve the wear resistance of the cemented carbide material; thereby, a gear cutting tool having an even longer lifecycle can be realized.

INDUSTRIAL APPLICABILITY

The present invention can be employed as a cemented carbide material for a surface coated gear cutting tool, and as a surface coated gear cutting tool, with which excellent properties in resistance to chipping, resistance to thermal cracking and resistance to chip adhesion can be obtained, even under high-speed hobbing conditions.

The invention claimed is:
1. A surface coated gear cutting tool comprising: a substrate consisting of a cemented carbide material for a surface coated gear cutting tool, and a hard coated layer formed on the substrate,
wherein said cemented carbide material comprises a WC-βt-Co based cemented carbide,
wherein said WC-βt-Co based cemented carbide comprises: WC; a βt solid solution; and Co,
wherein said WC and said βt solid solution are in the form of a hard phase, and said Co is in the form of a binder phase,
wherein the content of said Co is in a range of 12 to 17 wt %,
wherein said βt solid solution comprises: WC, TiC, TiN and either one or both of Ta carbonitride and Nb carbonitride,
wherein among the components of said βt solid solution, the content of the components excluding said WC is in a range of 15 to 20 wt %, and the total content of said Ta carbonitride and said Nb carbonitride is in a range of 5 to 7 wt %, wherein a Nb content $D_{Nb}$ and a Ta content $D_{Ta}$ in said βt solid solution satisfy a relational expression of $D_{Nb}/(D_{Nb}+D_{Ta}) \geq 0.7$, wherein said cemented carbide material is in the form of a sintered structure with a machined surface, and wherein said hard coated layer consists of either one of (Al, Ti)N, (Al, Ti)(C, N), (Al, Ti, Si)N, Ti(C, N), or (Al, Ti, Si)(B, N).

2. The surface coated gear cutting tool according to claim 1, wherein a fracture toughness of said cemented carbide material at room temperature is in a range of 9.5 to 13 $MPa(m)^{1/2}$.

\* \* \* \* \*